United States Patent [19]

Lazarus

[11] 4,105,305
[45] Aug. 8, 1978

[54] SPECTACLE FRAME WITH ANGULARLY ADJUSTABLE TEMPLES AND MEANS FOR MANUFACTURING AND ASSEMBLING SAME

[76] Inventor: Harry J. Lazarus, 36 Knox La., Englishtown, N.J. 07726

[21] Appl. No.: 710,788

[22] Filed: Aug. 2, 1976

[51] Int. Cl.² .................. G02C 5/14; G02C 5/04; B25B 27/14
[52] U.S. Cl. ................... 351/111; 351/158; 351/123; 29/278
[58] Field of Search .......... 351/123, 41, 111, 121, 351/141, 158, 29; 29/278, 280, 281, 282; 85/1 K; 151/41.73

[56] References Cited

U.S. PATENT DOCUMENTS

| | | | |
|---|---|---|---|
| 1,509,121 | 9/1924 | Willoughby | 85/1 K |
| 2,426,857 | 9/1947 | Birkenmaier | 85/1 K |
| 2,860,535 | 11/1958 | Fowler | 29/282 |
| 3,193,857 | 7/1965 | Kahn | 151/41.73 |
| 3,874,775 | 4/1975 | Lazarus | 351/41 |

*Primary Examiner*—Paul A. Sacher
*Assistant Examiner*—Rodney B. Bovernick
*Attorney, Agent, or Firm*—McGlew and Tuttle

[57] ABSTRACT

The spectacle frame includes a frontal lens support incorporating a nose bridge, a pair of temples, and hinges connecting each temple to an outer end of the lens support. A blind bore or socket is formed in either the lens support or the temple at at least one outer end of the lens support. A sleeve assembly, including an internally threaded sleeve and an externally threaded adjusting rotor member, is inserted in each socket. The adjusting rotor member has an outer end engaging the other of the lens support and the temple. The sleeve has a length less than the depth of the associated socket, and is formed with a flange on its outer end limiting forcing of the sleeve into the socket, under pressure, to a depth in which the flange is flush with the surface of the lens support or temple in which the bore or socket is formed. The adjusting member has a stop at its inner end preventing displacement from the sleeve, and is formed with a notched or knurled operating head particularly configured for operative association with tools for assembling the rotor in the sleeve and inserting the adjusting assembly in the socket. In a modification, the rotor member is threadedly engaged in an internally threaded aperture in a plate portion of a half hinge, the internally threaded aperture being axially aligned with a socket.

5 Claims, 16 Drawing Figures

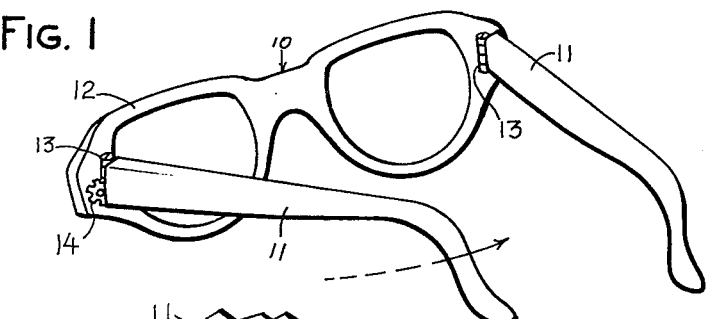
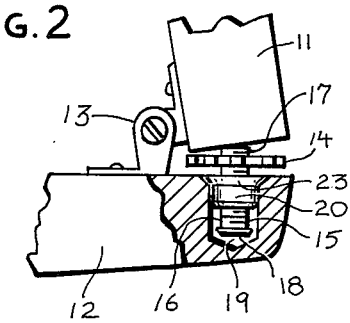
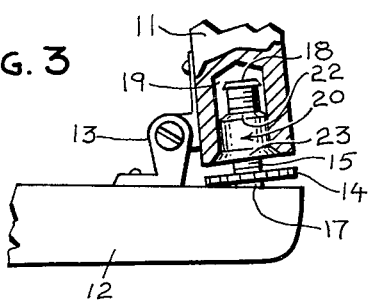
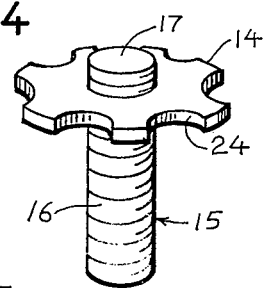
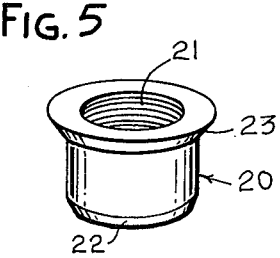
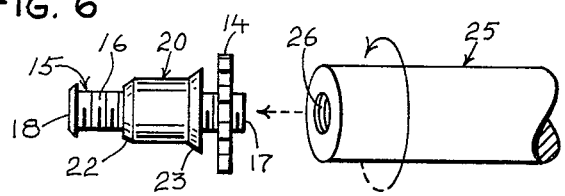
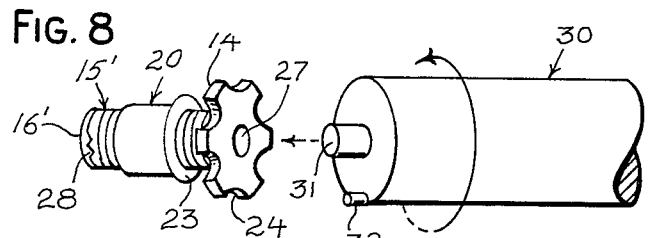
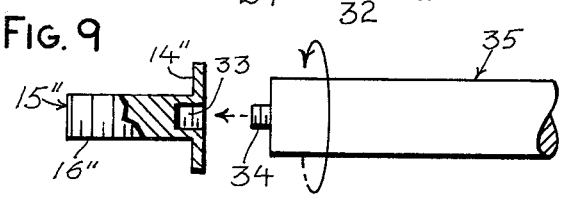
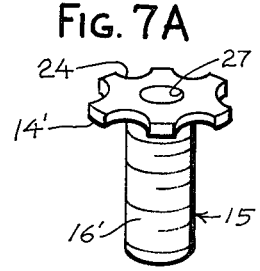
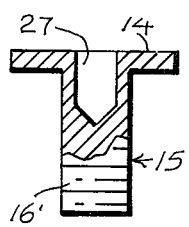
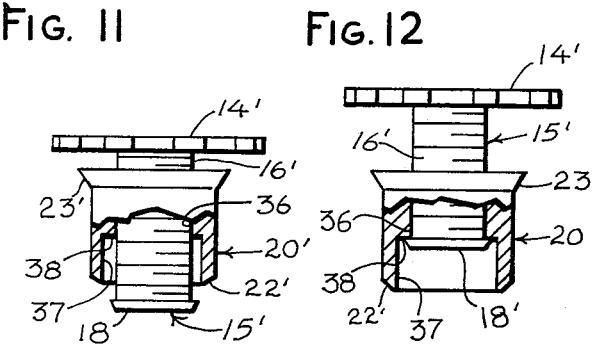
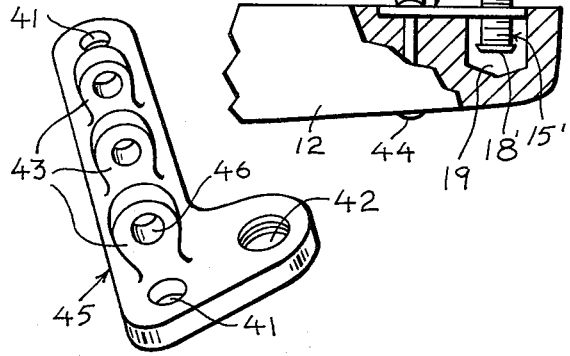
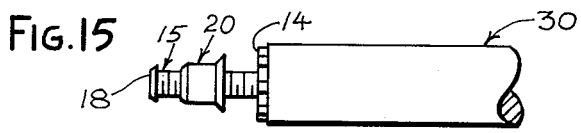

SPECTACLE FRAME WITH ANGULARLY ADJUSTABLE TEMPLES AND MEANS FOR MANUFACTURING AND ASSEMBLING SAME

FIELD AND BACKGROUND OF THE INVENTION

In my U.S. Pat. No. 3,874,775, issued Apr. 1, 1975, there is shown, described and claimed a spectacle frame with temples which are angularly adjustable while the spectacle frame is being worn on the head of a person, or when the spectacle frame is removed from the head. For this purpose, a threaded adjusting member, such as a thumb screw or rotor having a knurled or notched operating head, is threaded either into the frontal lens support or into the inner end of a temple for adjustable positioning therein, and has an outer end engageable with the other element of the lens frame, such as the temple or the frontal lens support, so that, by fingertip rotation of the knurled or notched head, the thumb screw or rotor can be threaded in or out. The rotor is so located that it is outwardly of the hinge or pintle of a hinge connecting a temple to a frontal lens support. Thereby, by threaded adjustment of the rotor, the temple can be swung inwardly relative to the lens support to increase the pressure with which the temple bears against the head of the wearer. The adjustable pressure prevents the frames from slipping on the wearer's nose, and provides the wearer with a control of the comfort or fit of the frame while additionally providing a sufficient pressure of the temples against the head to prevent the frame from uncomfortably slipping down over the wearer's nose during wearing of the spectacle frame. Preferably, a bore or socket is formed in the frontal lens support adjacent its outward end and outwardly of the hinge pintle, or alternatively the bore is formed in the inner end of the temple, and an internally threaded sleeve is inserted in this bore for threaded engagement with the thumb screw, rotor, or the like.

While the spectacle frame construction of U.S. Pat. No. 3,874,775 has proven satisfactory in practice, it has been found that occasionally the pressure exerted on the inner end of the temple, for example, by the rotor, may move the threaded sleeve inwardly in the bore beyond a preset position thus interfering with the range of the adjustment. It has further been found that, occasionally, the rotor may be moved outwardly sufficiently to become disengaged from the internally threaded sleeve. While displacement of the sleeve longitudinally of the bore, under pressure, or disengagement of the rotor from the sleeve, occur very rarely, they are nevertheless disadvantageous from the standpoint of the user of the spectacle frame.

SUMMARY OF THE INVENTION

In accordance with the invention, and for obviating the above-mentioned minor difficulties with respect to the spectacle frame shown in U.S. Pat. No. 3,874,775, the present invention comprises a novel sleeve and rotor arrangement. The sleeve has a length substantially less than the depth of the bore, and is provided with a flange on its outer end arranged to seat against the inner surface of the lens support to limit the extent to which the sleeve can be inserted into the bore. The inner end of the sleeve is preferably formed with a bevelled end facilitating such insertion. Prior to being positioned in the bore, the sleeve is assembled with the rotor threaded therethrough. After assembly, the rotor is provided with means at its inner end limiting or preventing disengagement of the rotor from the sleeve. Such means may comprise a riveted head on the inner end of the rotor or a rotation blocking formation in the threads of the rotor adjacent its inner end. The head of the rotor is knurled or notched and suitably formed for cooperation with an assembly tool which facilitates the formation of the sleeve rotor unit or assembly and insertion thereof into the bore, it being recognized that these parts are very small and thus difficult to hold in the fingers during assembly and insertion into the bore. For example, the rotor may have a threaded portion projecting outwardly of the operating head and arranged to threadingly engage in the inner end of an assembling tool. Alternatively, the head of the rotor may be provided with a smooth central bore arranged to receive a central pin on an assembling tool, this tool having an eccentrically located pin cooperable with the knurls or notches of the head for rotating the rotor for assembly in the internally threaded sleeve. The rotor may also be provided with an internally threaded bore in its outer end arranged to have a threaded operating end on an assembling tool threaded thereinto. As a fourth variation, the assembling tool may be provided with three or more annularly spaced projections on a circular surface, these projections being cooperable with the knurls or notches on the head of the rotor which, in this case, is not formed with either a threaded extension or a bore.

For an understanding of the principles of the invention, reference is made to the following description of typical embodiments thereof as illustrated in the accompanying drawings.

BRIEF DESCRIPTION OF THE DRAWINGS

In the Drawings

FIG. 1 is a perspective view of a spectacle frame with angularly adjustable temples as disclosed in my U.S. Pat. No. 3,874,775;

FIG. 2 is a plan view, partly in section, illustrating an adjusting assembly, embodying the invention, as positioned in a bore or socket in a lens support such as shown in FIG. 1;

FIG. 3 is a view similar to FIG. 2 but illustrating the adjusting assembly embodying the invention as positioned in a bore or socket formed in the end of a temple;

FIG. 4 is a perspective view of one form of threaded member or rotor of the adjusting assembly, having a notched or knurled head;

FIG. 5 is a perspective view of the internally threaded sleeve forming the second part of the adjusting assembly embodying the invention;

FIG. 6 is a part elevation view and part perspective view illustrating one embodiment of the adjusting assembly and its associated assembling tool;

FIGS. 7A and 7B are, respectively, a perspective view and an elevation view partly in section illustrating a modified form of threaded rotor;

FIG. 8 is a perspective view illustrating the rotor of FIGS. 7A and 7B and the associated assembling tool;

FIG. 9 is an elevation view, partly in section, of a modified rotor and the associated assembling tool;

FIG. 10 is a perspective view illustrating a further modified rotor and the associated assembling tool;

FIG. 11 is an elevation view, partly in section, of an adjusting assembly embodying the rotor of FIGS. 7A and 7B and the sleeve shown in FIG. 5, illustrating the rotor substantially fully retracted into the sleeve;

FIG. 12 is a view similar to FIG. 11 illustrating the rotor fully extended;

FIG. 13 is a perspective view of a half hinge for a spectacle frame, formed with a threaded aperture for receiving a rotor embodying the invention;

FIG. 14 is a plan view, partly in section, illustrating the hinge of FIG. 13 as assembled to a lens support, formed with a bore or socket, and having a rotor, such as shown in FIGS. 7A, 7B, 8, 9 and 10, assembled therewith; and FIG. 15 is a partial elevation view illustrating an adjusting assembly embodying the invention with an assembling tool engaged therewith.

DESCRIPTION OF THE PREFERRED EMBODIMENTS

Referring to the drawings, FIG. 1 illustrates a spectacle frame of the type disclosed in my mentioned U.S. Pat. No. 3,874,775. This frame, generally indicated at 10, includes temples 11 and a lens support 12, the temples 11 being hingedly connected to opposite ends of the lens support 12 by means of hinges 13. An adjustment means, such as a thumb screw rotor having a knurled or notched operating head 14, is interposed between at least one of the temples 11 and the adjacent end of the lens support 12, the adjustment means being effective outwardly of the axis or pintle of the associated hinge 13. As described in my mentioned patent, the user can, while frame 10 is off the head, or even while wearing the spectacle frame 10, adjust the angularity of the temples 11 relative to the lens support 12 by fingertip operation of the rotor operating head 14 of the adjustment means. As also described in my mentioned patent, the adjustment means having the operating head 14 comprises a threaded rotor engaged in an internally threaded sleeve in turn recessed in a bore or socket either in one or both of the outer ends of a lens support 12 or in the inner end of either one or both of the temples 11. The sleeve is secured against rotation so that, by operating the head 14, the threaded rotor is moved inwardly or outwardly thereby to vary the angle of the temple and thus vary the pressure of the temples 11 against the head, and this adjustment can be effected while the frame is held in the user's hands or while the user is wearing the spectacle frame.

As stated, minor difficulties are sometimes encountered with the adjustment means disclosed in my U.S. Patent 3,874,755. In particular, the sleeve may be forced, by pressure, deeper into the bore or socket in which it is seated, thus affecting the degree of adjustment possible. Furthermore, it is possible for the threaded member or rotor to be completely disengaged from the sleeve and, considering the very small size of the threaded rotor, the rotor can easily be lost. The present invention, in one aspect, is directed to an improved adjustment means by which forcing of the sleeve further into the bore or socket can be prevented as can also be loss or disengagement of the threaded rotor. While the bore receiving the adjustment means is hereinafter referred to as a "blind bore" or socket, primarily for the purpose of distinguishing the bore in the lens support or a temple from other "bores" mentioned hereinafter, it should be understood that the adjustment means-receiving bore or socket can extend either partially or completely through the associated spectacle frame element.

Various forms of the improved adjustment means embodying the invention are disclosed in FIGS. 1 through 12 and 15, with a modified improved adjustment means being disclosed in FIGS. 13 and 14. As best seen in FIGS. 2, 3, 4 and 5, the adjustment means or adjustment assembly comprises a threaded rotor 15 which is threadedly engaged, in telescopic relation in an internally threaded sleeve generally indicated at 20. The rotor 15, shown more particularly in FIG. 4, comprises a threaded stud or the like 16, having an outer end 17, and having a notched operating head 14 fixedly secured thereto slightly inwardly from the threaded outer end 17.

The sleeve 20 is a tubular member which is internally threaded, as indicated at 21, and has a bevelled inner end 22. The outer end of internally threaded sleeve 20 is formed with a radially outwardly extending flange 23. After assembly of rotor 15 in telescoping relation in sleeve 20, the adjusting assembly comprising the rotor and the sleeve is arranged to be inserted into a blind bore or socket 19 which may be formed either in an outer end of lens support 12, outwardly of a hinge 13, as shown in FIG. 2, or in the inner end of a temple 11, as shown in FIG. 3. Sleeve 20 has an axial length which is very considerably shorter than the depth of the blind bore or socket 19, while being sufficient for stable seating of the sleeve in the socket and is seated into the bore or socket 19 to the extent such that the outer surface of flange 23 is substantially flush with the inner surface of lens support 12, as shown in FIG. 2, or with the surface of the inner end of temple 11, as shown in FIG. 3. The bore or socket 19 may be circular or may have any other desired form, and the sleeve 20 is securely seated therein and held against rotation, as by a press fit, by cementing, or otherwise, so that sleeve 20 is non-rotatable as is stable. With the adjustment assembly positioned in the bore or socket 19, the outer end 17 of rotor 15 bears against the inner end of the temple 11, as in FIG. 2, or against the inner surface of the lens support 12, as in FIG. 3. Thus, by fingertip operation of notched head 14, rotor 15 can be threaded into or out of sleeve 20 to a desired extent to set the desired angular adjustment of a temple 11 relative to lens support 12, thereby increasing or decreasing the pressure with which the temples 11 bear against the head of the wearer, and this adjustment can optionally be effected either while the spectacle frame 10 is being worn on the wearer's head or when the spectacle frame is not being worn. The provision of the flange 23 prevents sleeve 20 from being forced into blind bore or socket 19, to an undesired depth, and the provision of the rivet head 18 on the inner end of the stud portion 16 of threaded rotor 15 prevents disengagement of rotor 15 from sleeve 20, this rivet head 18 being formed on the inner end of rotor 15 after the rotor has been assembled telescopically through sleeve 20 to form the adjusting assembly.

FIG. 6 illustrates the adjusting assembly 15–20 as arranged for operative association with an assembling tool 25 which is in the form of a cylindrical rod having a threaded bore at one end threadedly engageable with the outer end 17 of the rotor 15. With the tool 25 threadedly engaged with the rotor 15, the latter can be easily assembled in accurate axial alignment in sleeve 20 and the adjusting assembly 15–20 can be press-fitted in proper axial alignment into the socket 19 in either the lens support 12 or a temple 11.

FIGS. 7A and 7B illustrate a preferred modified form of rotor 15'. The rotor 15' comprises a threaded stud 16' having a notched head 14' formed integrally with one end thereof, and this end of the stud 16' is formed with a smooth axial bore 27. The rotor 15' can be used with the sleeve 20 to form a telescopic adjusting assembly 15'-20, after which the inner end of the stud 16' either may be formed with a rivet head 18, as shown in FIGS. 2, 3 and 6, or at least one of the threads at the inner end of the stud 16 may be "kinked", as shown at 28 in FIG. 8, or otherwise deformed, to provide stop means preventing disengagement of rotor 15' from sleeve 20 by "outward" screwing of the rotor 15'.

As shown in FIG. 8, a tool 30 is cooperable with the adjusting assembly 15'-20 for assembling rotor 15' in accurate axial alignment in sleeve 20 and press-fitting the adjusting assembly into a bore 19 with accurate axial alignment. The tool 30, like the tool 24, can also be used for screwing the rotor into the sleeve 20, with proper axial alignment before the inner end of the rotor is deformed. For this purpose, the tool 30 is provided at one end with an axially projecting pin 31 engageable in the smooth bore 27 in the rotor 15', and with a peripheral or outer pin 32 engageable in a notch 24 of the head 14, thereby providing for rotation of rotor 15' by tool 30, which otherwise is a substantially cylindrical bar of selected length.

A further modified rotor 15" is shown in FIG. 9 as comprising a threaded stud 16" having a knurled or notched head 14" integral with the outer end thereof and formed with a threaded bore 33 extending inwardly from this outer end. Rotor 15" is cooperable with an assembling tool 35 which is in the form of a cylindrical rod having a threaded stud 34 projecting axially from one end and engageable in the threaded bore 33 of rotor 15". By the use of tool 35, rotor 15" can be assembled an accurate axial alignment in a sleeve 20 and then its inner end can be deformed, as shown in either FIG. 6 or FIG. 8, so that the rotor 15" cannot be screwed out of the sleeve 20. The adjusting assembly 15"-20 can then be press-fitted, with accurate axial alignment into a socket 19 by use of the tool 35.

A still further modified form of rotor is shown in FIG. 10, the rotor 15''' comprising a threaded stud 16''' formed integrally with a knurled head 14''' having notches 24'''. The rotor 15''' can be assembled with accurate axial alignment in a sleeve 20 by the use of the tool 40 which is in the form of a cylindrical rod having angularly spaced projections 39 at one end engageable in the notches 24'''. When the rotor 15''' has been assembled into a sleeve 20, its inner end may be deformed, in the manners mentioned above, to prevent disengagement of the rotor 15''' from the sleeve, and then the tool 40 can be used to press-fit the adjusting assembly 15'''-20, with accurate axial alignment into a socket 19, it being noted that the outer diameter of the sleeve 20 is such that it will have firm press-fit engagement in the socket 19.

FIGS. 11 and 12 show a modified form of sleeve 20' cooperable with the rotor 15' of FIG. 8. Sleeve 20' is formed with the bevelled inner end 22' and the flange 23'. In addition, the outer portion of sleeve 20' is formed with an internal thread 36 and, inwardly of internal thread 36, sleeve 20' is formed with a smooth and unthreaded larger diameter bore 37. The junction of the internal thread 36 and the larger diameter smooth bore 37 forms a ledge or shoulder 38 which is engageable by the riveted end 18' of the rotor 15' to prevent rotor 15' from being screwed out of sleeve 20'. The smooth bore 37 provides a greater unscrewing distance or length of travel for rotor 15', while providing sleeve 20' with an overall length sufficient to assure sleeve 20' from "tipping" in a socket 19 into which the assembly is inserted. Alternatively, of course, the inner end of rotor 15' can have a "kinked" thread, or the innermost thread may be otherwise deformed to prevent rotor 15' being screwed out of sleeve 20'. The internal diameter of the unthreaded portion of sleeve 20' is sufficient to provide adequate clearance for rotor 15', including its limiting means 18', during rotation of rotor 15' in sleeve 20'.

It is also possible to use solely the threaded rotor 15', for example, in association with a hinge 45 for providing the adjusting means. As shown in FIGS. 13 and 14, the hinge 45 is formed with rivet-receiving holes 41, for attaching the hinge to a frame element, and hinge rings 43 each having a hole 46. In accordance with the invention, a lateral extension of hinge 45 is formed with an internally threaded aperture 42. When the hinge has been assembled to a support frame 12, by means of rivets 44, the aperture 42 is so located that it is aligned with a socket 19. Before such assembly, the rotor 15' is threaded through the aperture 42' and its inner end is riveted over, or otherwise deformed, as at 18'. The rotor 15' can then no longer be completely disengaged from the hinge 45, and the assembly 15'-45 is then secured to the lens support 12 by the use of the rivets 44, or by any other means customarily used for such securement. With the arrangement of FIGS. 13 and 14, rotor 15' is permanently at a fixed distance from hinge rings 43 so that its notched head 14' has a permanently fixed clearance with the hinge rings.

FIG. 15 is an illustrative view showing the tool 30 as operatively engaged with the rotor 15' threaded telescopically through the sleeve 20' for insertion of the sleeve and rotor assembly into a socket 19 with accurate axial alignment, tool 30 being engaged with the head 14' of rotor 15'. The illustration of FIG. 15 also represents the tools of FIGS. 6, 9 and 10 as engaged with the associated rotor for such insertion.

It should be noted that, in each of its described embodiments of the adjusting mechanism, the externally threaded rotor has a length greater than that of the associated internally threaded member, such as the sleeve, so that the rotor is actually telescoped through the sleeve or the like for projection out of either end of the latter.

While specific embodiments of the invention have been shown and described in detail to illustrate the application of the principles of the invention, it will be understood that the invention may be embodied otherwise without departing from such principles.

What is claimed is:

1. In a spectacle frame of the type including a frontal lens support incorporating a nose bridge, a pair of temples, respective hinges connecting each temple to the respective outer end of the lens support, a socket formed in one of the lens support and the temple, adjacent at least one outer end of the lens support, an internally threaded element axially aligned with each socket, and an externally threaded adjusting number threadedly engaged in each internally threaded element and having an outer and engaging the other of the lens support and the temple at a point spaced outwardly from the axis of the associated hinge, with the internally threaded element having an axial length less than the depth of the associated socket with which it is axially aligned and having an outer end which is substantially flush with the surface of that one, of the lens support and the temple, formed with the associated socket, and with the externally threaded adjusting member being constituted by a threaded rotor having an operating head on its outer end and a threaded stem extending inwardly from the head and threadedly engaged through the associated internally threaded element, and with each internally threaded element and the associated threaded rotor conjointly defining a temple adjusting assembly in which the head of the rotor is engaged with the other of the lens support and temple for adjustment of the angularity of the temple to the lens support by rotation of the associated rotor relative to the associated internally threaded element, and with the head of each rotor having a periphery formed for effecting rotation of the associated rotor by a person wearing the spectacle frame, each rotor having an axial length substantially longer than the threaded length of the associated internally threaded element whereby the rotor has a telescopic relation with the associated internally threaded element: the improvement comprising each rotor, after telescopic assembly into its associated internally threaded element having the inner end of its threaded stem formed with limiting means limiting outward movement of the rotor relative to the associated internally threaded element to a position in which the rotor remains threadedly engaged in the associated threaded element; the head of each rotor limiting inward movement of the rotor, relative to its associated internally threaded element, to a depth less than the depth of the associated socket; each internally threaded element having an area of surface engagement with that one, of the lens support and the temple, having the socket formed therein sufficient to stabilize the internally threaded element to maintain the internally threaded element in accurate axial alignment with the associated socket by resistance to off-axis stresses imposed on the internally threaded element during operation of said adjusting assembly to adjust the angularity of the temple to the lens support; each rotor being movable, by rotation thereof, through an axial distance very substantially greater that the axial extent of the threads of the associated internally threaded element before the rotation is limited by engagement of said limiting means with a portion of the associated internally threaded element spaced axially a substantial distance from the inner end of said socket; the head of each rotor having its outer surface formed with an unthreaded axially extending recess, and also being formed with a notched periphery; and a tool operatively engageable with the rotor head to axially align the rotor with the associated internally threaded element and to thread the rotor into the associated internally threaded element, by rotation thereof, to form said adjusting assembly; said tool being formed with an elongated handle and with an operating end engageable with the outer surface of the head of a rotor; said operating end having a pin extending centrally therefrom for engagement into said unthreaded axially extending recess in the rotor head and with means cooperable with said notches to effect rotation of the associated rotor, when said pin is thus engaged in said recess; whereby said tool may be engaged with a rotor to axially align the rotor with the associated internally threaded element and then to rotate the rotor to thread it through the associated internally threaded element to form said adjusting assembly, after which the inner end of the stem of the associated rotor is formed with said limiting means limiting outward movement of the rotor relative to the associated internally threaded element to maintain the rotor constantly threadedly engaged through the associated internally threaded element; said tool thereafter being operable to have said adjusting assembly mounted thereon, through engagement of said pin into said rotor recess, whereby said adjustment assembly may be accurately guided in accurate axial alignment with the associated socket during assembly of the adjusting assembly with that one, of the lens support and temple, having said socket formed therein.

2. The improvement claimed in claim 1, in which said internally threaded element is an internally threaded sleeve which, during assembly of the temple adjusting assembly into that one of the lens support and the temple having the socket formed therein, is pressed into the socket in accurate axial alignment therewith by said tool; said sleeve being formed with means, on its outer end, limiting inward displacement thereof to a position in which its outer end is substantially flush with that one of the lens support and the temple having said socket formed therein; said sleeve having an axial length such that said temple adjusting assembly is stably maintained in assembled relation in said socket to resist off-axis stresses imposed thereon during adjustment of the angularity of the temple to the lens support by rotation of the associated rotor.

3. The improvement claimed in claim 2, in which said sleeve is internally threaded for a distance extending from its outer end to a point intermediate its inner and outer ends, the remaining length of said sleeve being unthreaded and having an internal diameter greater than that of the threaded length of said sleeve to form a shoulder at the junction of the threaded and unthreaded portions of said sleeve to engage said limiting means; whereby outward movement of the associated rotor is limited to a position in which the inner end of the associated rotor is substantially at said shoulder; the internal diameter of said unthreaded portion being sufficiently large to provide clearance for rotation of said rotor and axial movement of said rotor through said unthreaded portion; said associated rotor having an extended telescopic outward movement relative to the associated sleeve due to the fact that the threaded portion of the sleeve, adjacent the outer end of the sleeve, has a length substantially less than the overall axial length of the associated sleeve, thereby providing increased temple adjustability and, in a thin-walled optical frame, requiring a shallower socket for receiving said temple adjusting assembly, which is thus miniaturized, extending telescopic outward movement of the rotor relative to the associated sleeve which provides extended rotor adjustability, with extended adjustability of the angularity of the temple to the lens support, to compensate for the miniaturization requirements.

4. The improvement claimed in claim 1, in which each hinge comprises a pair of half hinges having interfitting rings with a hinge pintle engageable through the interfitted rings; said internally threaded element comprising a threaded aperture extending through a plate extending laterally outwardly from the rings of one half hinge; and being axially aligned with said socket upon assembly of the half hinge to that one, of the lens support and the temple, having said socket formed therein; each threaded rotor being threadedly engaged in the internally threaded aperture of the associated half hinge in advance of assembly of the associated half hinge to that one, of the lens support and the temple, having said socket formed therein, and after such engagement through the associated internally threaded aperture, and before the associated half hinge is assembled with the spectacle frame, being formed with said limiting means on its inner end limiting outward movement of the rotor relative to the internally threaded aperture; said internally threaded aperture, being formed in the half hinge, being always at a fixed lateral distance from the rings of the associated half hinge to provide a fixed lateral operating clearance with the head of the associated rotor, and with the internally threaded aperture, being formed directly in the half hinge, being maintained against separation from the associated half hinge during use of the spectacle frame, providing uninterrupted adjustability of the angularity of the temple to the lens support.

5. The improvement claimed in claim 4, in which the inner surface of said plate portion, overlying said socket, provides a restrictive shoulder encircling said internally threaded aperture; whereby movement of the associated rotor through the entire axial depth of said socket is unrestricted until said rotor stem limiting means is engaged with said restrictive shoulder; said unrestricted movement of said rotor in turn providing an extended adjustment of the angularity of the temple to the lens support.

* * * * *